US009124770B2

(12) United States Patent
Waisbard et al.

(10) Patent No.: US 9,124,770 B2
(45) Date of Patent: Sep. 1, 2015

(54) METHOD AND SYSTEM FOR PREVENTION OF CONTROL WORD SHARING

(71) Applicant: Cisco Technology Inc., San Jose, CA (US)

(72) Inventors: Erez Waisbard, Or-Yehuda (IL); Hillel Solow, Beit Shemesh (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/017,016

(22) Filed: Sep. 3, 2013

(65) Prior Publication Data

US 2014/0079216 A1    Mar. 20, 2014

(30) Foreign Application Priority Data

Sep. 20, 2012  (IL) .......................................... 222034
Apr. 4, 2013   (GB) .................................. 1306082.7

(51) Int. Cl.
| *H04L 29/06* | (2006.01) |
| *H04N 7/167* | (2011.01) |
| *H04N 21/266* | (2011.01) |
| *H04N 21/418* | (2011.01) |
| *H04N 21/4405* | (2011.01) |

(52) U.S. Cl.
CPC ......... *H04N 7/167* (2013.01); *H04N 21/26606* (2013.01); *H04N 21/4181* (2013.01); *H04N 21/4405* (2013.01)

(58) Field of Classification Search
CPC ................. H04N 21/00; H04N 21/266; H04N 21/26606; H04N 7/1675; H04N 21/4181; H04L 63/062; H04L 63/068; H04H 60/14; H04H 60/23

USPC .......................................................... 380/200
See application file for complete search history.

(56) References Cited

U.S. PATENT DOCUMENTS

| 7,155,611 B2 | 12/2006 | Wajs et al. |
| 7,239,704 B1 | 7/2007 | Maillard et al. |
| 7,881,478 B2 | 2/2011 | Derouet |

FOREIGN PATENT DOCUMENTS

| WO | WO 2007/116390 A2 | 10/2007 |
| WO | WO 2007116390 A2 * | 10/2007 |

OTHER PUBLICATIONS

Sep. 24, 2013 Office Communication in connection with prosecution of GB 1306082.7.

*Primary Examiner* — Yogesh Paliwal
(74) *Attorney, Agent, or Firm* — Hahn Loeser & Parks LLP

(57) ABSTRACT

A method and system of preventing control word sharing, the method and system including receiving a temporal key, denoted $TK_i$, at a removable security element, receiving an entitlement control message (ECM), the ECM including a control word derivable by the removable security element, deriving the control word from the ECM at the removable security element, combining at least the control word and a value associated with an ID of the removable security element, thereby producing combined control word and removable security element ID data, encrypting the combined control word and removable security element ID data according to an encryption function, wherein the encrypting includes using $TK_i$ as an encryption key, and at a time after a removable security element interface has received $TK_i$, but prior to a start of a crypto period with which the control word is associated, sending the encrypted combined control word and removable security element ID data to the removable security element interface. Related apparatus, methods and systems are also described.

16 Claims, 3 Drawing Sheets

US 9,124,770 B2

METHOD AND SYSTEM FOR PREVENTION OF CONTROL WORD SHARING

RELATED APPLICATION INFORMATION

The present application claims the benefit of priority from unpublished Israel Patent Application IL 222034, of NDS Limited, filed 20 Sep. 2012, and from unpublished UK Patent Application GB 1306082.7, filed 4 Apr. 2013. Both unpublished applications are entitled, "Method and System for Prevention of Control Word Sharing".

FIELD OF THE INVENTION

The present invention relates to systems for securing control words in video distribution systems.

BACKGROUND OF THE INVENTION

With the improvements to the ability of providers of conditional access to prevent attackers from cloning or circumventing the service protection that is provided by smartcards, hackers have increasingly turned to the "card sharing" or "control word sharing" methods of attack. In these attacks, a pirate-customer Alice receives the encrypted content stream from a public source such as a satellite network or CDN, and relies on a central hacker server provided by Eve to provide her with the content decryption keys.

This type of attack is particularly applicable to the timing of key distribution in conditional access systems. For various logistical reasons, it is necessary to allow preparation of the control word needed to access the content seconds before it is actually used to encrypt content. For example, the presence of PVR functionality in a system means that a single device could be processing several streams simultaneously. Furthermore, features such as Picture-in-picture (PIP), and multi-screen systems also increase the number of streams processed. In all these cases, as there is typically only one smartcard or secure chip, and it must be accesses serially, key messages or ECMs can often pile up in a queue. In order to ensure than no matter what the case is, the key is ready in time, it is often necessary to send the key message or ECM early enough to ensure that the key will be ready in time. This provides Eve plenty of time to distribute the control word over the internet to Alice (and others). (Note that the designation of "Alice" and "Eve" follows the convention in use in cryptography, wherein "Alice" is sending a message to "Bob", and "Eve" is trying to eavesdrop. "Mallory" is trying to maliciously attack the exchange between the Alice and Bob. Sometimes Eve and Mallory are used interchangeably.)

Summarizing the above discussion, the control word is available early is due to the bottleneck of getting the smartcard to prepare the control word, and the fact that the smartcard may need to handle several simultaneous streams.

Accordingly, a method and system is presented which makes card sharing attacks more difficult and/or costly. Currently, the control words are ready earlier than they are needed. This is a significant problem, primarily because these control words are in no way unique per user. All valid set top boxes receive the same control word (as they all decrypt the same content stream), and thus this control word doesn't expose Eve to detection.

The use of the term set top box is used herein to refer to any device which has a security element (often a removable security element) such as a smart card or other hardware which receives entitlement control messages (ECMs) and generates control words (CWs) from them. The CWs are sent by the security element to an interface comprised in the device for use in decrypting video. As such, the device to which term set top box refers to may in fact comprise a set top box; a portable video recorder (PVR); a hand held device; a table device; or other device comprising the above mentioned elements. Other hardware and software, as is known in the art are also comprised in the set top box.

Accordingly, it is necessary to deliver ECMs early enough to ensure processing, even if there are several ECMs to process at the same time. Thus, the delivery of these ECMs cannot simply be delayed by the headend.

SUMMARY OF THE INVENTION

The present invention, in certain embodiments thereof, seeks to provide an improved method by which control words are determined based on their corresponding ECMs, the control words are combined with an identifier associated with the security element, and then the combined security element identifier and control word are then encrypted. The encrypted combined security element identifier and control word is sent to the security element interface in the device (typically a security element interface in a set top box), and only decrypted there shortly before the start of a new crypto period for which the control word is needed.

If, for whatever reason the encrypted combined security element identifier and control word is shared and intercepted, by decrypting the encrypted combined security element identifier and control word, it is possible to then determine the identifier of the security element which presumably is the source of the leak of the encrypted combined security element identifier and control word.

There is thus provided in accordance with an embodiment of the present invention a method of preventing control word sharing, the method including receiving a temporal key, denoted $TK_i$, at a removable security element, receiving an entitlement control message (ECM), the ECM including a control word derivable by the removable security element, deriving the control word from the ECM at the removable security element, combining at least the control word and a value associated with an ID of the removable security element, thereby producing combined control word and removable security element ID data, encrypting the combined control word and removable security element ID data according to an encryption function, wherein the encrypting includes using $TK_i$ as an encryption key, and at a time after a removable security element interface has received $TK_i$, but prior to a start of a crypto period with which the control word is associated, sending the encrypted combined control word and removable security element ID data to the removable security element interface.

Further in accordance with an embodiment of the present invention the removable security element includes one of a smart card, a secure chip, and an embedded security element.

Still further in accordance with an embodiment of the present invention the removable security element interface includes a smart card-interface module included in a set top box.

Additionally in accordance with an embodiment of the present invention the value associated with the removable security element ID includes at least one of the removable security element ID number, a hash of the removable security element ID number, and an encrypted value resulting from encrypting the removable security element ID number.

Moreover in accordance with an embodiment of the present invention the combining operation including at least one of an output of XORing the control word with the value associated with the removable security element ID, a concatenation of the control word with the value associated with the removable security element ID, a hash of the control word with the value associated with the removable security element ID, and an encrypted value resulting from the control word with the value associated with a removable security element ID.

Further in accordance with an embodiment of the present invention including receiving a temporal key, denoted $TK_i$, at a removable security element interface, receiving a value including an encrypted combined control word and removable security element ID data, decrypting the encrypted combined control word and removable security element ID data according to the temporal key $TK_i$, performing a decombining operation to decombine the control word from the removable security element ID data, thereby producing the control word and removable security element ID data, and utilizing the decrypted decombined control word to decrypt video.

Still further in accordance with an embodiment of the present invention the removable security element interface includes a module in a set top box.

Additionally in accordance with an embodiment of the present invention the removable security element includes one of a smart card, a secure chip, and an embedded security element.

Moreover in accordance with an embodiment of the present invention the value associated with the removable security element ID includes at least one of the removable security element ID number, a hash of the removable security element ID number, and an encrypted value resulting from encrypting the removable security element ID number.

Further in accordance with an embodiment of the present invention the combining operation including at least one of an output of XORing the control word with the value associated with the removable security element ID, a concatenation of the control word with the value associated with the removable security element ID, a hash of the control word with the value associated with the removable security element ID, and an encrypted value resulting from the control word with the value associated with a removable security element ID.

Still further in accordance with an embodiment of the present invention including receiving a value including an encrypted combined control word and removable security element ID data, wherein the received value is shared in order to enable control word sharing, receiving a temporal key, denoted $TK_i$, decrypting the encrypted combined control word and removable security element ID data according to the temporal key $TK_i$, performing a decombining operation to decombine the control word from the removable security element ID data, thereby producing the control word and removable security element ID data, and utilizing the decrypted decombined removable security element ID data to determine the ID of the removable security element at which originated the value shared in order to enable control word sharing.

Additionally in accordance with an embodiment of the present invention the removable security element includes one of a smart card, a secure chip, and an embedded security element.

Moreover in accordance with an embodiment of the present invention the removable security element interface includes a module in a set top box.

Further in accordance with an embodiment of the present invention the value associated with the removable security element ID includes at least one of the removable security element ID number, a hash of the removable security element ID number, and an encrypted value resulting from encrypting the removable security element ID number.

Further in accordance with an embodiment of the present invention the combining operation including at least one of an output of XORing the control word with the value associated with the removable security element ID, a concatenation of the control word with the value associated with the removable security element ID, a hash of the control word with the value associated with the removable security element ID, and an encrypted value resulting from the control word with the value associated with a removable security element ID.

There is also provided in accordance with another embodiment of the present invention a system of preventing control word sharing, the system including a removable security element which receives a temporal key, denoted $TK_i$, the removable security element receives an entitlement control message (ECM), the ECM including a control word derivable by the removable security element, the removable security element derives the control word from the ECM, a combiner which combines at least the control word and a value associated with an ID of the removable security element, thereby producing combined control word and removable security element ID data, a crypto engine which encrypts the combined control word and removable security element ID data according to an encryption function, wherein the encrypting includes using $TK_i$ as an encryption key, and at a time after a removable security element interface has received $TK_i$, but prior to a start of a crypto period with which the control word is associated, the encrypted combined control word and removable security element ID data is sent to the removable security element interface.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
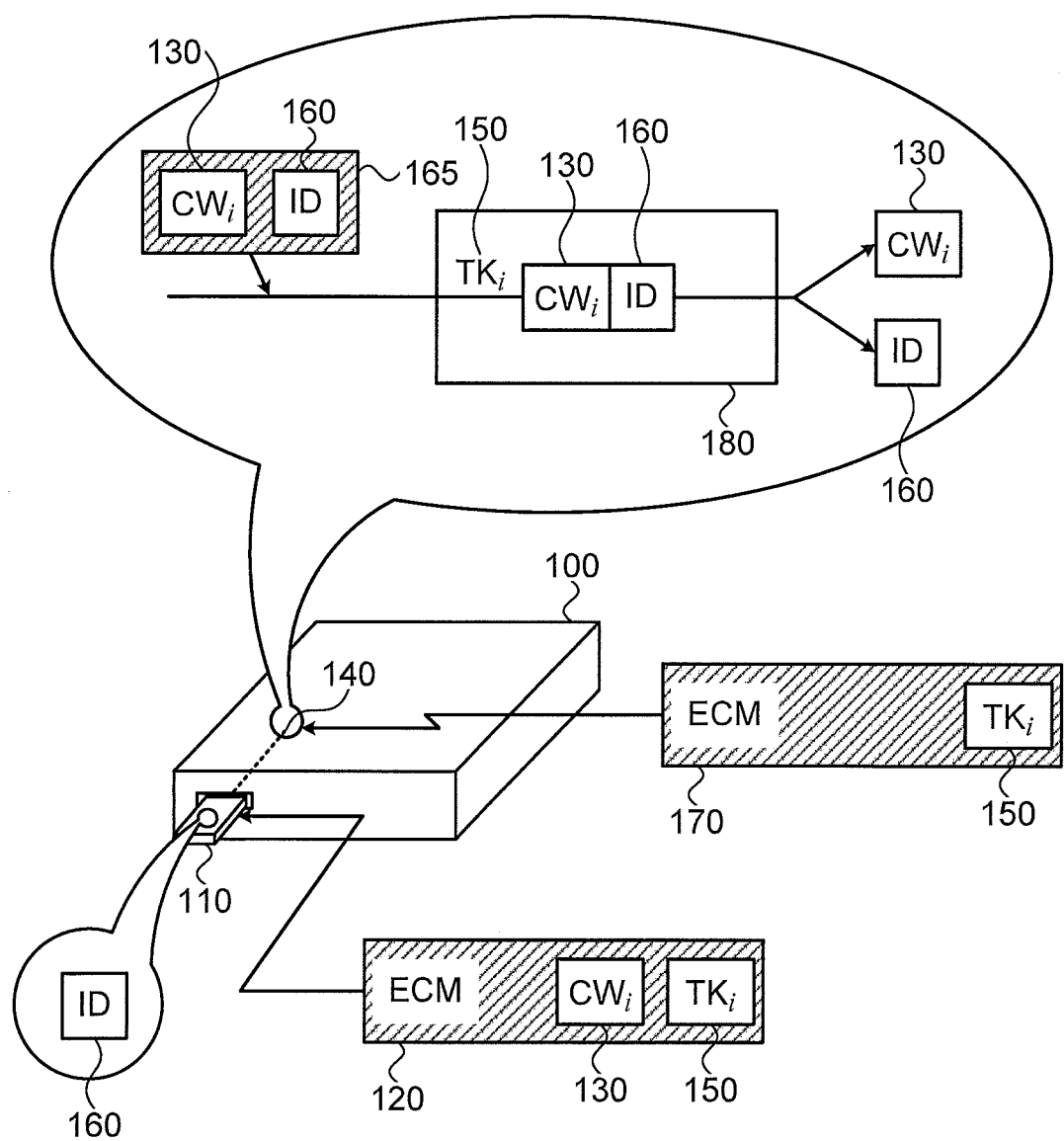
FIG. 1 is a simplified pictorial illustration of a set top box in which an embodiment of the present invention is operative.

Reference is now made to FIG. 1 which is a simplified pictorial illustration of a set top box in which an embodiment of the present invention is operative. A set top box 100 comprising a security element 110, depicted here as a smart card is shown inserted in the set top box 100. Those skilled in the art will appreciate that, although depicted as a smart card, the security element 110 may, in fact not be a smart card, and may be removable, such as the smart card, or, alternatively, may not be removable, for instance, and without limiting the generality of the foregoing, a secure chip, or other embedded security element. The set top box 100 also comprises a module which, at least in part, comprises a hardware interface 140 with the security element 110. The security element 110 interface may also comprise software components.

The set top box 100 additionally comprises a video/audio descrambler and decoder (not depicted) for descrambling and decoding video/audio. Those skilled in the art will appreciate that video/audio is a typical use case, but other data and metadata may be comprised in the data stream which is descrambled and decoded. Other standard components, as are known in the art, are also present in the set top box 100 (such components including but not limited to memory, storage, processors, a communications bus, and so forth).

As is known in the art, an entitlement control message (ECM) 120 is received at the set top box 100. Those skilled in the art will appreciate that the ECM 120 typically comprises at least one of a section comprising information directed at the security element 110. A second section of the ECM 120 comprises information directed at the removable security element interface 140. The removable security element interface 140 (hereinafter, "security element interface 140"), is typically comprised in the set top box 100.

The ECM 120 is received encrypted, and may only be decrypted by the security element 110 if the security element 110 possesses an appropriate key for decrypting the encrypted ECM 120. Assuming that the security element 110 possesses said key, then the security element 110 decrypts the ECM 120. The ECM 120 comprises a control word (CW) 130, depicted in FIG. 1 as $CW_i$. The depiction of the control word 130 as $CW_i$ 130 indicates that $CW_i$ 130 is the control word (i.e. cryptographic key) for an $i^{th}$ crypto period. During the $i^{th}$ crypto period the video/audio descrambler is only able to descramble video/audio using $CW_i$ 130. Once the crypto period changes to the $(i+1)^{th}$ crypto period, then $CW_{i+1}$ (not depicted) would be needed to descramble video/audio.

Figure 2:
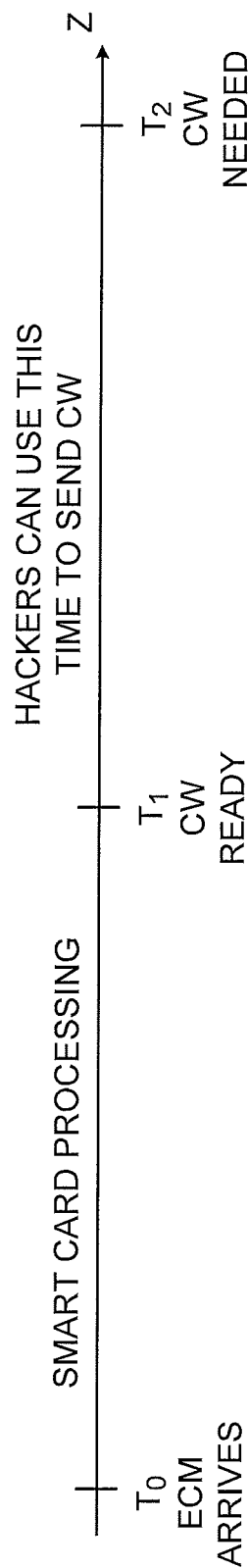
FIG. 2 is a timeline depicting typical production of control words in prior art systems.

Reference is now additionally made to FIG. 2, which is a timeline depicting typical production of control words in prior art systems. Once the security element 110 decrypts the ECM 120, the $CW_i$ 130 is sent to the security element interface 140. Once the $CW_i$ 130 is decrypted, typically some amount of time before $CW_i$ 130 is needed to decrypt the encrypted video/audio, the $CW_i$ 130 may be copied from a memory of the set top box 100 by a hacker (i.e. someone attempting to gain access to the encrypted audio/video by circumventing its security system, i.e. the encryption) and distributed over a network (e.g. the Internet) for use during the $i^{th}$ crypto period.

Referring again to FIG. 1, the ECM 120 comprises a common temporal key ($TK_i$) 150. $TK_i$ 150 is common to all recipients of the ECM 120. $TK_i$ 150 is selected at the broadcast headend, or other authority which manages access to whatever content item is encrypted by the $CW_i$ 130 comprised in the ECM 120. $TK_i$ 150 is delivered in the security element section of the ECM 120. Alternatively, $TK_i$ 150 is delivered in any other way possible to the security element 110. For example, and without limiting the generality of the foregoing, a special message might be sent in any way possible (e.g., in generic metadata over a telephone or IP network connection) to the security element 110, without encompassing the message in the ECM 120. However, $TK_i$ 150 is not delivered to the security element interface 140 at this stage. Alternatively, the security element 110 might have all of the possible values of $TK_i$ 150 in its internal storage, or might have a secret algorithm to generate all of the possible values of $TK_i$ 150. However, in such a case, the security element 110 would not have the value of $TK_i$ 150 until it is needed.

When the security element 110 receives the ECM 120 comprising $CW_i$ 130 and $TK_i$ 150, the security element 110 derives $CW_i$ 130 as it usually would upon receipt of an ECM 120. However, rather than send $CW_i$ 130 to the security element interface 140, the security element 110 combines $CW_i$ 130 with a value associated with an ID of the removable security element 160 (for instance, a the removable security element ID number 160; a hash of the removable security element ID number 160; and an encrypted value resulting from encrypting the removable security element ID number 160). The combining $CW_i$ 130 with the value associated with the ID 160 of the removable security element is performed in such a way that if the combined value 165 is leaked (i.e. shared over a network, as discussed above), the value associated with the ID 160 of the removable security element becomes knowable. Once the value associated with the ID 160 of the removable security element becomes knowable, a search for the leaker/hacker is provided with significant information to use in the search.

The combining the $CW_i$ 130 with the value associated with the ID of the removable security element 160 may be performed at least in any of the following ways:

XORing the $CW_i$ 130 with the value associated with the removable security element ID 160;

concatenating the $CW_i$ 130 with the value associated with the removable security element ID 160;

hashing the $CW_i$ 130 with the value associated with the removable security element ID 160; and encrypting the $CW_i$ 130 with the value associated with a removable security element ID 160.

The combined 165 $CW_i$ 130 and the value associated with a removable security element ID 160 are then encrypted according to an encryption function. $TK_i$ 150 is used as an encryption key for the encryption function.

An integrity check, also computed using $TK_i$ 150 as an encryption key may optionally be added to the encrypted combined 165 $CW_i$ 130 and the value associated with a removable security element ID 160 as well. The integrity check is performed to prevent an attack in which someone who doesn't know the keys can mix parts from different users, namely key from one user and ID of another. In many cases this is impossible, but in some cases such attacks are known to work. Thus a hash value or a signature (in the more general case) may be added as the integrity check protect against such an attack.

The encrypting of the combined 165 $CW_i$ 130 and the value associated with a removable security element ID 160, as well as the optional adding of the integrity check data ensures that a hacker cannot modify the encrypted value in in a way that would provide $CW_i$ 130 but avoid detection of the value associated with a removable security element ID 160.

Prior to the start of the $i^{th}$ crypto period, the security element interface 140 receives $TK_i$ 150 in an ECM 170 (i.e. in the ECM 170 security element interface 140 section).

At a time after the security element interface 140 has received $TK_i$ 150 in the ECM 170 section directed to the security element interface 140, but prior to a start of a crypto period with which the control word is associated (i.e. prior to the start of the $i^{th}$ crypto period for $CW_i$ 130 and $TK_i$ 150), the encrypted combined 165 $CW_i$ 130 and the value associated with a removable security element ID 160 is sent to the security element interface 140.

Having received $TK_i$ 150, the security element interface 140 is now able to decrypt the encrypted combined 165 $CW_i$ 130 and the value associated with a removable security element ID 160. A crypto engine 180 applies a decryption function to decrypt the encrypted combined 165 $CW_i$ 130 and the value associated with a removable security element ID 160 (typically the inverse of the encryption function used to encrypt decrypt the encrypted combined 165 $CW_i$ 130 and the value associated with the removable security element ID 160). $TK_i$ 150 is used as an decryption key for the decryption function.

At this point, the security element interface 140 now has access to $CW_i$ 130 which can be used to decrypt the video/audio by the set top box 100 video/audio descrambler.

Should $CW_i$ 130 be leaked, it could be retrieved by an operator of the broadcast headend, or other authority which manages access to content, and, similar to the security element interface 140, the broadcast headend, or other authority which manages access to content could determine the removable security element ID 160. The determined removable security element ID 160 is most likely the ID 160 of the removable security element associated with the hacker who is source of the leaked control word.

Figure 3:
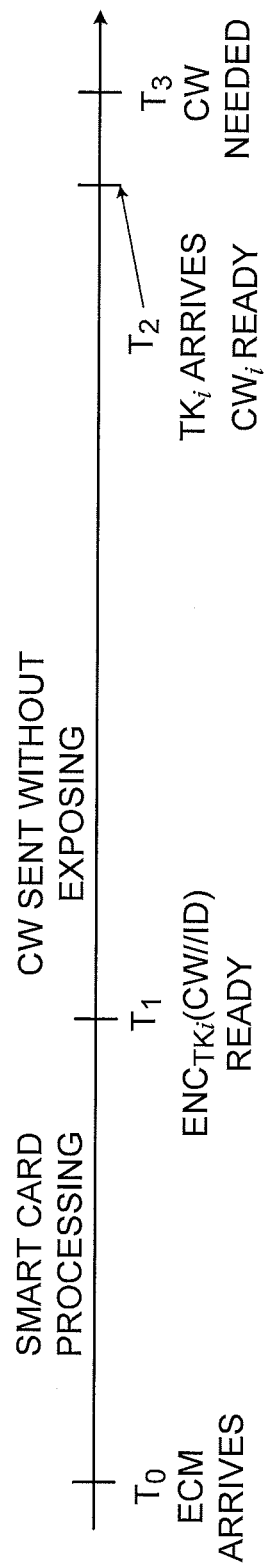
FIG. 3 is a timeline depicting typical production of control words in the system of FIGS. 1.

Reference is now made to FIG. 3, which is a timeline depicting typical production of control words in the system of FIG. 1. FIG. 3 is believed to be self-explanatory in light of the above discussion.

Those of skill in the art will appreciate that as a result of the additional encryption, hackers who share their control words will be faced with the choice of either: sharing their control words early, but allowing anyone with $TK_i$ 150 access to the value associated with their security element 110; or, alternatively waiting only until $TK_i$ 150 arrives, and then sharing the actual control word relatively late, but without access to the value associated with their security element 110.

In a typical set top box 100 environment, the security element 110 (such as a smart card, as noted above) is slow, relative to the processor speed of computing elements comprised in the set top box 100 itself. Therefore, the security element 110 becomes a bottleneck due to the need to process PIP (picture-in-picture); multiple ECMs for video and audio, and so forth (as mentioned above, sometimes PVR functionality causes this). Additionally, gateway, or multi-room set top boxes, where a single smartcard serves multiple screens (e.g. with relatively inexpensive mini-STBs or connected TVs) increases the number of ECMs that might need to be processed simultaneously. In order to overcome the bottleneck created, ECMs are typically sent out early, relative to when they are needed. However, decryption of the combined 165 $CW_i$ 130 and the value associated with a removable security element ID 160 using $TK_i$ 150 as a decryption key is relatively quick. Therefore $TK_i$ 150 can, in principle, be delivered to the security element interface 140 only milliseconds before $CW_i$ 130 is needed to decrypt the video stream. Accordingly, clients of the hackers will be without the ability to buffer data and will have to wait for the delayed control words in order to properly view the stolen content.

Figure 4:
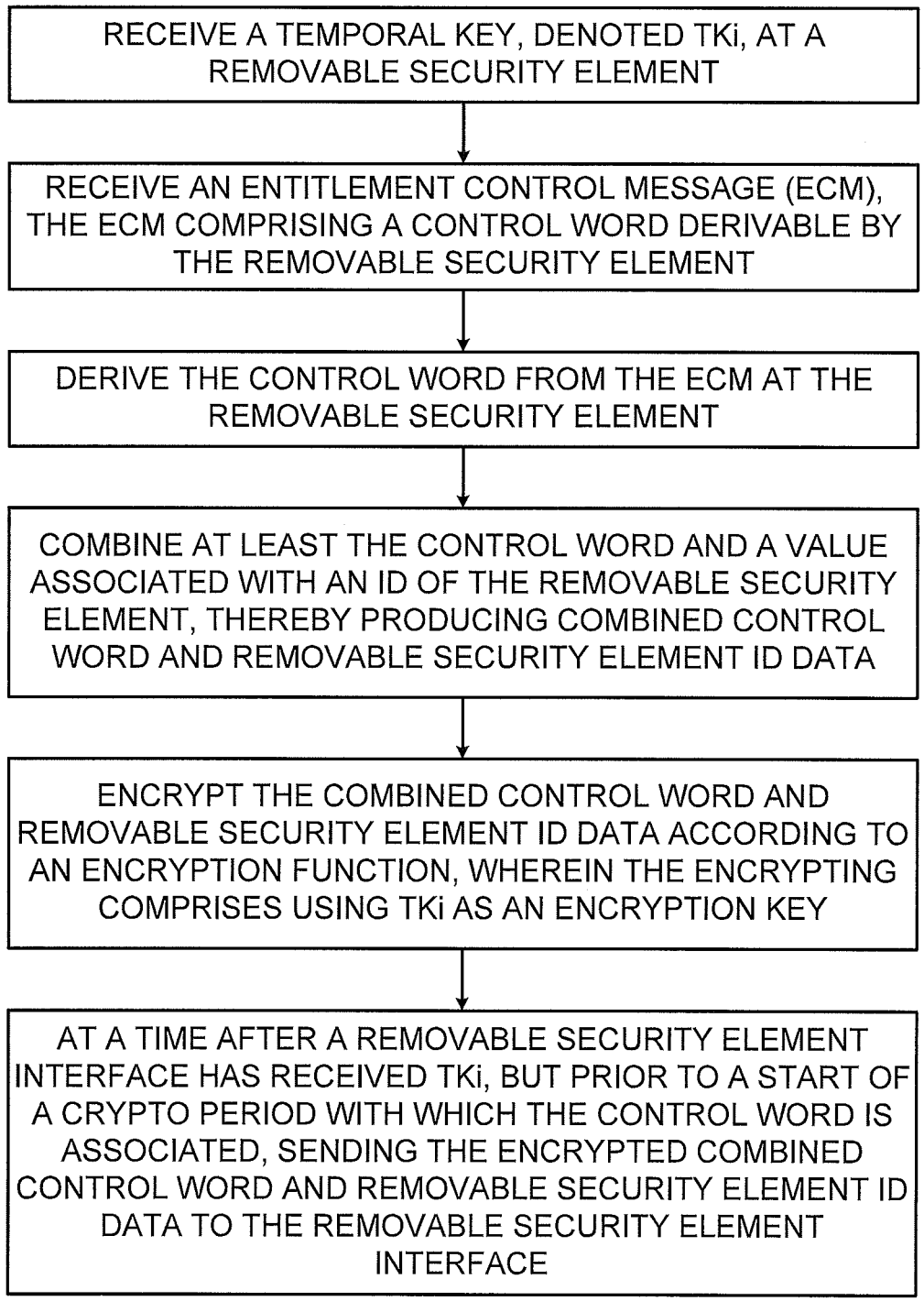
FIG. 4 is a simplified flowchart diagram of methods of operation of the system of FIG. 1.

Reference is now made to FIG. 4, which is a simplified flowchart diagram of preferred methods of operation of the system of FIG. 1. The method of FIG. 4 is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method of preventing control word sharing, the method comprising:
   receiving an entitlement control message (ECM), the ECM comprising a temporal key, denoted $TK_i$, at a removable security element, the ECM further comprising a control word derivable by the removable security element;
   deriving the control word from the ECM at the removable security element;
   combining at least the control word and a value associated with an ID of the removable security element, thereby producing combined control word and removable security element ID data;
   encrypting the combined control word and removable security element ID data according to an encryption function, wherein the encrypting comprises using $TK_i$, as an encryption key; and
   at a time after a removable security element interface has received $TK_i$, in the ECM, but prior to a start of a crypto period with which the control word is associated, sending the encrypted combined control word and removable security element ID data to the removable security element interface.

2. The method according to claim 1 wherein the removable security element comprises one of: a smart card; a secure chip; and an embedded security element.

3. The method according to claim 1 wherein the removable security element interface comprises a smart card-interface module comprised in a set top box.

4. The method according to claim 1 wherein the value associated with the removable security element ID comprises at least one of:
   the removable security element ID number;
   a hash of the removable security element ID number; and
   an encrypted value resulting from encrypting the removable security element ID number.

5. The method according to claim 1 wherein the combining operation comprising at least one of:
   an output of XORing the control word with the value associated with the removable security element ID;
   a concatenation of the control word with the value associated with the removable security element ID;
   a hash of the control word with the value associated with the removable security element ID; and
   an encrypted value resulting from the control word with the value associated with a removable security element ID.

6. A method of preventing control word sharing, the method comprising:
   receiving an entitlement control message (ECM), the ECM comprising a temporal key, denoted $TK_i$ at a removable security element interface;
   receiving a value comprising an encrypted combined control word and removable security element ID data;
   decrypting the encrypted combined control word and removable security element ID data according to the temporal key $TK_i$;
   performing a decombining operation to decombine the control word from the removable security element ID data, thereby producing the control word and removable security element ID data; and
   utilizing the decrypted decombined control word to decrypt video.

7. The method according to claim 6 wherein the removable security element interface comprises a module in a set top box.

8. The method according to claim 6 wherein the removable security element comprises one of: a smart card; a secure chip; and an embedded security element.

9. The method according to claim 6 wherein the value associated with the removable security element ID comprises at least one of:
- the removable security element ID number;
- a hash of the removable security element ID number; and
- an encrypted value resulting from encrypting the removable security element ID number.

10. The method according to claim 6 wherein the combining operation comprising at least one of:
- an output of XORing the control word with the value associated with the removable security element ID;
- a concatenation of the control word with the value associated with the removable security element ID;
- a hash of the control word with the value associated with the removable security element ID; and
- an encrypted value resulting from the control word with the value associated with a removable security element ID.

11. A method of preventing control word sharing in a video distribution system, the method comprising:
- prior to a start of a crypto period with which a control word is associated, receiving a value comprising an encrypted combined control word and removable security element ID data at a security element, wherein the received value is shared in order to enable control word sharing;
- receiving a temporal key in an entitlement control message (ECM), denoted $TK_i$, at the security element;
- decrypting the encrypted combined control word and removable security element ID data according to the temporal key $TK_i$;
- performing a decombining operation to decombine the control word from the removable security element ID data, thereby producing the control word and removable security element ID data; and
- utilizing the decrypted decombined removable security element ID data to determine the ID of the removable security element at which originated the received value that was shared in order to enable control word sharing.

12. The method according to claim 11 wherein the removable security element comprises one of: a smart card; a secure chip; and an embedded security element.

13. The method according to claim 11 wherein the removable security element interface comprises a module in a set top box.

14. The method according to claim 11 wherein the value associated with the removable security element ID comprises at least one of:
- the removable security element ID number;
- a hash of the removable security element ID number; and
- an encrypted value resulting from encrypting the removable security element ID number.

15. The method according to claim 11 wherein the combining operation comprising at least one of:
- an output of XORing the control word with the value associated with the removable security element ID;
- a concatenation of the control word with the value associated with the removable security element ID;
- a hash of the control word with the value associated with the removable security element ID; and
- an encrypted value resulting from the control word with the value associated with a removable security element ID.

16. A system of preventing control word sharing, the system comprising:
- a removable security element which receives an entitlement control message (ECM), the ECM comprising a temporal key, denoted $TK_i$, the ECM further comprising a control word derivable by the removable security element, the removable security element being operative to derive the control word from the ECM;
- a combiner which combines at least the control word and a value associated with an ID of the removable security element, thereby producing combined control word and removable security element ID data;
- a crypto engine which encrypts the combined control word and removable security element ID data according to an encryption function, wherein the encrypting comprises using $TK_i$, as an encryption key; and
- at a time after a removable security element interface has received $TK_i$, in the ECM, but prior to a start of a crypto period with which the control word is associated, the encrypted combined control word and removable security element ID data is sent to the removable security element interface.

* * * * *